(12) United States Patent
Pochon et al.

(10) Patent No.: US 10,171,746 B2
(45) Date of Patent: Jan. 1, 2019

(54) DRONE WITH A FRONT-VIEW CAMERA WITH SEGMENTATION OF THE SKY IMAGE FOR AUTO-EXPOSURE CONTROL

(71) Applicant: PARROT DRONES, Paris (FR)

(72) Inventors: Benoit Pochon, Vincennes (FR); Axel Balley, Paris (FR); Henri Seydoux, Paris (FR)

(73) Assignee: Parrot Drones, Paris (FR)

( * ) Notice: Subject to any disclaimer, the term of this patent is extended or adjusted under 35 U.S.C. 154(b) by 210 days.

(21) Appl. No.: 15/256,404

(22) Filed: Sep. 2, 2016

(65) Prior Publication Data
US 2017/0078552 A1 Mar. 16, 2017

(30) Foreign Application Priority Data
Sep. 10, 2015 (FR) ...................................... 15 58421

(51) Int. Cl.
*H04N 5/235* (2006.01)
*H04N 5/232* (2006.01)
(Continued)

(52) U.S. Cl.
CPC ......... *H04N 5/2353* (2013.01); *B64C 39/024* (2013.01); *B64D 47/08* (2013.01);
(Continued)

(58) Field of Classification Search
CPC .... B64C 39/024; B64D 47/08; G05D 1/0038; G06K 9/0063; G06K 9/4604;
(Continued)

(56) References Cited

U.S. PATENT DOCUMENTS

2007/0036460 A1* 2/2007 Koch ........................ G06T 3/60
382/276
2007/0263090 A1* 11/2007 Abe .......................... B60R 1/00
348/148
(Continued)

FOREIGN PATENT DOCUMENTS

JP 2003267295 A 9/2003

OTHER PUBLICATIONS

Miyauchi et al., "Develpment of Omni-Directional Image Stabilization System Using Camera Posture Information", Robotics and Biomimetics 2007, p. 920-925, XP031252928.
(Continued)

*Primary Examiner* — Edward Park
(74) *Attorney, Agent, or Firm* — Haverstock & Owens LLP (57) ABSTRACT

The drone comprises a camera (14), an inertial unit (46) measuring the drone angles, and an extractor module (52) delivering image data of a mobile capture area of reduced size dynamically displaced in a direction opposite to that of the variations of angle measured by the inertial unit. The module analyses the image data elements of the useful area to assign to each one a weighting coefficient representative of a probability of belonging to the sky, and defines dynamically a boundary of segmentation (F) of the useful area between sky and ground as a function of these weighting coefficients. Two distinct groups of regions of interest ROIs are defined, for the sky area and for the ground area, respectively, and the dynamic exposure control means are controlled as a function of the image data of the ROIs of one of these groups, in particular by excluding the ROIs of the sky area.

8 Claims, 5 Drawing Sheets

(51) Int. Cl.
*B64C 39/02* (2006.01)
*B64D 47/08* (2006.01)
*G05D 1/00* (2006.01)
*G06K 9/00* (2006.01)
*G06K 9/46* (2006.01)
*G06T 3/00* (2006.01)
*H04N 5/225* (2006.01)

(52) U.S. Cl.
CPC ......... *G05D 1/0038* (2013.01); *G06K 9/0063* (2013.01); *G06K 9/4604* (2013.01); *G06T 3/0018* (2013.01); *H04N 5/2254* (2013.01); *H04N 5/235* (2013.01); *H04N 5/2351* (2013.01); *H04N 5/23238* (2013.01); *H04N 5/23248* (2013.01)

(58) Field of Classification Search
CPC ................ G06T 3/0018; H04N 5/2254; H04N 5/23238; H04N 5/23248; H04N 5/235; H04N 5/2351; H04N 5/2353
See application file for complete search history.

(56) References Cited

U.S. PATENT DOCUMENTS

2012/0307042 A1   12/2012  Lee et al.
2014/0176722 A1    6/2014  Sashida
2016/0366326 A1* 12/2016  Sen ..................... H04N 5/2353

OTHER PUBLICATIONS

Anonymous, The New Parrot Bebbo Drone: Built for Stabilized Aerial Video Explora, Oct. 6, 2014, XP055233862, pp. 1-3.
Ying et al., "The Analusis of Image Stabilization Technology Based on Small-UAV Airborne Video", Computer Science Electronics Engineering, pp. 586-589, XP032171263.

* cited by examiner

DRONE WITH A FRONT-VIEW CAMERA WITH SEGMENTATION OF THE SKY IMAGE FOR AUTO-EXPOSURE CONTROL

The invention relates to the processing of digital images captured by a camera on board a mobile apparatus, in particular a motorized flying device such as a drone.

The invention advantageously applies to the images collected by the front camera of a rotary-wing drone such as a quadricopter.

The AR.Drone 2.0 or the Bebop Drone of Parrot SA, Paris, France, are typical examples of such quadricopters. They are equipped with a series of sensors (accelerometers, 3-axis gyrometers, altimeters), a front camera capturing an image of the scene towards which the drone is directed, and a vertical-view camera capturing an image of the overflown ground. They are provided with multiple rotors driven by respective motors, which can be controlled in a differentiated manner so as to pilot the drone in attitude and speed. Various aspects of such drones are described in particular in the WO 2010/061099 A2, EP 2 364 757 A1, EP 2 613 213 A1 or EP 2 613 214 A1 (Parrot SA).

The front video camera can be used for an "immersive mode" piloting, i.e. where the user uses the image of the camera in the same way as if he were himself on board the drone. It may also serve to capture sequences of images of a scene towards which the drone is directed. The user can hence use the drone in the same way as a camera or a camcorder that, instead of being held in hand, would be borne by the drone. The collected images can be recorded then broadcast, put online on video-hosting web sites, sent to other Internet users, shared on social networks, etc.

These images being intended to be recorded and communicated, it is desirable that they have the less defects possible, in particular defects caused by the behaviour of the drone that, in practice, introduces various untimely artefacts in the final image displayed to the user.

Such defects may be tolerable in an "immersive piloting" configuration. But, if the matter is to use the drone as a mobile video camera to capture sequences that will be recorded and played later, these defects are extremely cumbersome, so that it is desirable to reduce them to a minimum.

A so-called EIS (Electronic Image Stabilization) technique consists in acquiring on the sensor a fixed area of greater extent than the capture area that will be used. The compensation is operated by a translation of the capture are to the acquisition area, in the direction opposite to the movement to be compensated for, the sensor transmitting only a sub-part corresponding to the stabilized image. The implementation of such a compensation is simple. On the other hand, the compensation amplitude is limited by the ratio between the size of the capture area and that of the acquisition area, i.e. the effective size of the sensor used. Concretely, the maximum angle compensation amplitude is limited to a few degrees.

The article of Miyauchi R et al., "Development of Omni-Directional Image Stabilization System Using Camera Posture Information", *Proceedings of the* 2007 *IEEE International Conference on Robotics and Biomimetics*, Dec. 15-18, 2007, pp. 920-925 proposes to apply such an EIS technique to the image captured by a camera provided with a hemispherical field lens of the "fisheye" type, i.e. covering a field of about 180°. The raw image is acquired in totality (which is possible in real time because it is a low-resolution CCD sensor), subjected to a straightening process (to compensate for the fisheye distortions) and then to a process of dynamic windowing as a function of the movements of the robot that carries the camera. This image stabilization technique is however possible only because the camera is a camera with a low-resolution CCD sensor (640×480 pixels, i.e. 0.3 Mpixel). On the other hand, it would not be applicable to the stabilization of a useful image of HD quality (1920×1080 pixels, i.e. 2 Mpixels), itself windowed from a raw fisheye image of very high resolution, formed for example on a sensor of 14-Mpixel resolution: if the whole raw image were transferred in such conditions to be processed, this would correspond to a pixel data flow of 14 Mpixels for each image, leading to a framerate of the order of 6 images per second (ips) at this resolution, which would be insufficient for a fluid video sequence, requiring a framerate of approximately 30 ips.

Moreover, the simple translation of an area of the image is not mathematically sufficient to compensate for a rotation of the camera, because it is not a real correction of the change of perspective induced by rotations. Finally, it is a compensation by post-processing of the image data acquired by the sensor, which does not allow compensating for certain real-time effects.

In the case of the above-mentioned Bebop Drone, the latter implements a camera provided with a hemispherical field lens of the fisheye type covering a field of about 180°, forming a raw image on a 14-Mpixel (4608×3288 pixel) resolution sensor, then windowed in real time from an image of HD quality (1920×1080 pixels, i.e. 2 Mpixels).

An article of Timothy McDougal, published on Internet, entitled "The New Parrot Bebop Drone: Built for Stabilized Aerial Video", dated 6 Oct. 2014 (XP055233862) describes in particular this Bebop Drone device, with its fisheye lens associated with an image stabilization and control system. More precisely, in this device, a particular window (hereinafter "capture area") is selected in the overall hemispherical image formed at the surface of the sensor. This window is mobile in rotation and in translation, and moved permanently as a function of the movements of the drone determined by the inertial unit, and in the opposite direction with respect to these movements. Of course, the image collected by the fisheye lens undergoes the same movements of oscillation and rotation as a conventional camera, but the displacement of the image area is controlled to as to compensate for these movements and to then produce an image stabilized for the movements of the drone.

The image of the capture area, more exactly a useful part (hereinafter "useful area") of the latter, is then subjected to a reprojection process to compensate for the geometric distortions introduced by the fisheye lens: straightening of the straight lines curved by the lens, reestablishment of a uniform magnification between the centre and the periphery of the image, etc. The final image obtained ("straightened useful area") is then transmitted to the user to be displayed on a screen, recorded, etc.

A "virtual camera" is hence made available by extraction from the total scene captured of a particular area (the capture area) that is dynamically displaced, in rotation and in translation, in the initial image, in the direction opposite to the movements of the drone so as to annihilate the oscillations that would otherwise be observed in the final image displayed to the user, then by application of an image straightening process to obtain a representation of the scene with no geometric nor other distortion.

This technique, implemented within the Bebop Drone device presented in the above-mentioned article of Timothy McDougal, is exposed in details in the EP 2 933 775 A1 (Parrot), published on 21 Oct. 2015.

The present invention aims to eliminate a particular problem that appears during certain movements of the drone.

This problem relates to the control of the auto-exposure (AE) algorithm, which analyses the brightness of different areas of the image and chooses automatically for the sensor a couple (time of exposure, gain) making it possible to capture any scene with a same target brightness. This choice is operated based on an analysis of a reduced-definition version of the image (for example, 64×48 pixels), hereinafter "thumbnail", obtained by sub-sampling or decimation, and from which are extracted brightness histograms as well as, possibly, other parameters, such different start data being hereinafter referred to by the general term of "statistics" of the image.

In the above-mentioned case of a capture area extracted from the overall image collected by the sensor, this is the content of the thumbnail coming from the capture area that produces the statistics.

But, as explained hereinafter, this capture area is greater than the final useful area that will be displayed to the user, so that the auto-exposure algorithm can make decisions based on elements of the scene that the user does not see, i.e. elements located inside the capture area but outside the useful area.

Now, the scene that is desired to be correctly exposed is that which is seen by the user (the useful area), and not the capture area, which is different from the latter.

In the typical case of an image comprising a part of sky and a part of ground, the proportion between sky and ground will vary according to the camera inclination, which itself varies permanently as a function of the drone attitude. That way, if the drone passes from a hovering flight attitude to a downwardly inclined attitude (this tilting producing a forward linear displacement), then the camera, inclined towards the ground (because it is linked to the drone body) will capture a far higher proportion of ground. As the ground is darker, the control of the auto-exposure algorithm will tend to compensate for this brightness variation by an increase of the time of exposure and/or of the gain.

However, due to the displacement of the capture area in the initial image and to the reprojection operated to extract therefrom the useful area, the user will always see the same scene. But this scene will have been temporarily overexposed due to the corrective action of the auto-exposure, over-exposure that will disappear when the drone will go back to its initial attitude—and without thereby the outlines of the image seen by the user have changed.

Moreover, the limited dynamics of the sensor does not allow correctly exposing both the sky and the ground in all the situations.

Of course, imaging techniques of the "HDR" (High Dynamic Range) type are known, which consist in merging images taken in sequence at a very short interval with different exposure settings, each image having its own dynamic range. But, in the particular case of a camera on board a flying drone, this technique cannot be used because it would introduce significant time artefacts due to the rapidity of displacements of the drone (and hence of the camera) and to the vibrations to which it is subjected.

The object of the invention is to propose a technique making it possible, dynamically and in real time, to determine which part of the image of the scene captured by the camera corresponds to the sky and which part corresponds to the ground, or to determine that it is not possible to operate a delimitation between sky and ground (as in the typical case of a drone flying indoor).

After this determination, the image will then be segmented into a sky area and a ground area, so as to be able to process differently the sky area and the ground area of the thumbnail, generally by choosing to expose only (or mainly) for the ground area.

The invention proposes for that purpose essentially to calculate for each pixel or macropixel (hereinafter "image data") a weighting coefficient representative of a probability of this pixel or macropixel to belong to the sky (or conversely to the ground), so as to be able to:
  expose for the area including the most details (generally the ground, rarely the sky), and
  expose uniformly even if the sky/ground ratio varies strongly and rapidly (typically during abrupt changes of attitude of the drone) and by compensating for the distortions introduced by the lens of the fisheye.

More precisely, the invention proposes a drone comprising, in a manner known in itself, in particular from the Bebop Drone device according to a technique exposed in detail in the above-mentioned EP 2 933 775 A1:
  a camera linked to the drone body, comprising a hemispheric-field lens of the fisheye type, pointing in a fixed direction with respect to the drone body, a digital sensor collecting the image formed by the lens, and means for the automatic control of the sensor exposure;
  an inertial unit, adapted to measure the Euler angles characterizing the instantaneous attitude of the drone with respect to an absolute terrestrial reference system and delivering as an output current drone attitude data;
  extractor means, adapted to define, in said image formed by the lens over the extent of the sensor, the position of a capture area of reduced size;
  control means, receiving as an input the current drone attitude data and adapted to dynamically modify the position and the orientation of the capture area in said image in a direction opposite to that of the changes of values of the angles measured by the inertial unit;
  reprojection means, receiving as an input image data, formed of pixels or macropixels, of a useful area extracted from the capture area and delivering as an output corresponding straightened image data, compensated for the geometric distortions introduced by the fisheye lens; and
  analysis means, adapted to define a plurality of regions of interest ROIs distributed over the useful area, and to control the dynamic exposure control means as a function of the respective image data contained in a thumbnail coming from the useful area, in each ROI.

Characteristically of the invention, the analysis means are moreover adapted to:
  analyse said current image data of the useful area so as to assign to each of these data elements a weighting coefficient representative of a probability of belonging to the sky;
  dynamically define at each image a boundary of segmentation of the useful area between a sky area and a ground area, as a function of the weighting coefficients assigned to each image data element;
  define two distinct groups of ROIs, for the sky area and for the ground area, respectively; and
  control the dynamic exposure control means as a function of the respective image data elements contained in the thumbnail coming from the useful area, in ROIs of one of said selected groups.

The weighting coefficient representative of a probability of belonging to the sky may be a coefficient function of:

the position of the current image data element analysed by the analysis means with respect to a theoretical horizon direction delivered by the inertial unit; and/or the image data of the vicinity of the current image data element analysed by the analysis means; and/or the drone altitude with respect to the ground, the drone comprising means adapted to deliver an estimated value of this altitude; and/or the illuminant of the scene captured by the camera, the camera comprising means for analysing this illuminant; and/or the pitch inclination of the drone with respect to the horizontal.

The ROIs may be ROIs whose size and/or position are defined dynamically at each image in the useful area, or ROIs defined by a grid of ROIs distributed in a uniform and predetermined manner over the useful area.

An example of implementation of the present invention will now be described, with reference to the appended drawings in which the same references denote identical of functionally similar elements throughout the figures.

Examples of implementation of the present invention will now be described.

Figure 1:
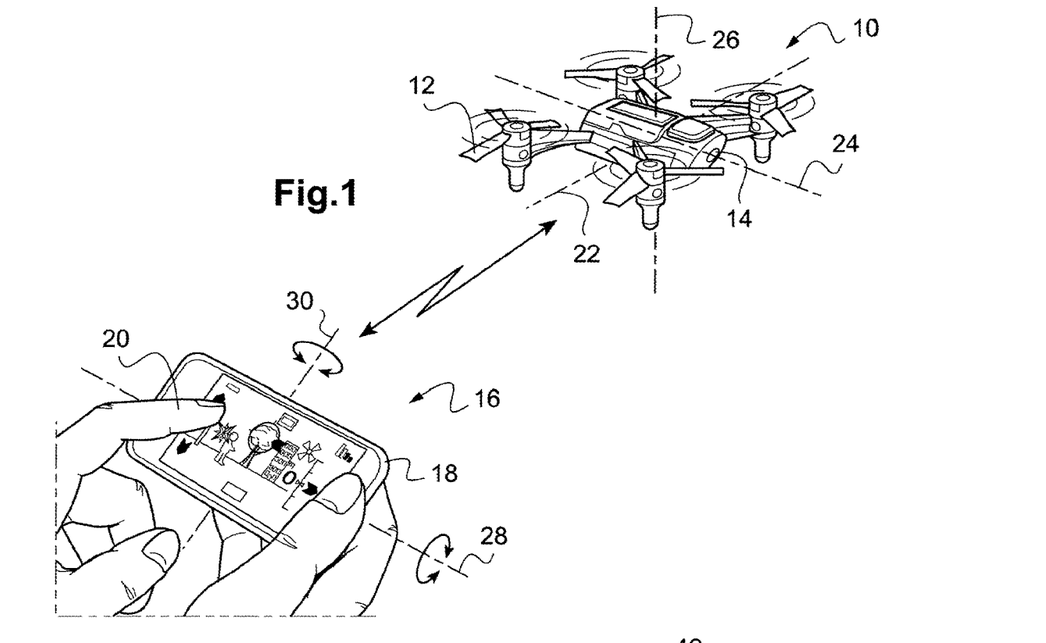
FIG. 1 is an overall view showing the drone and the associated remote-control device allowing the remote piloting thereof.

In FIG. 1, the reference 10 generally denotes a drone, which is for example a quadricopter such as the model Bebop Drone of Parrot SA, Paris, France. This drone includes four coplanar rotors 12 whose motors are piloted independently from each other by an integrated navigation and attitude control system. It is provided with a front-view camera 14 permitting to obtain an image of the scene towards which the drone is directed.

The drone also includes a vertical view camera (not shown) pointing downward, adapted to capture successive images of the overflown land and used in particular to evaluate the speed of the drone with respect to the ground. Inertial sensors (accelerometers and gyrometers) permit to measure with a certain accuracy the angular speeds and the attitude angles of the drone, i.e. the Euler angles (pitch $\varphi$, roll $\theta$ and $\psi$) describing the inclination of the drone with respect to a horizontal plane in a fixed terrestrial reference system. An ultrasound telemeter arranged under the drone moreover provides a measurement of the altitude with respect to the ground.

The drone 10 is piloted by a remote-control device 16 provided with a touch screen 18 displaying the image on board the front camera 14, with in superimposition a certain number of symbols allowing the activation of piloting commands by simple contact of a user's finger 20 on the touch screen 18. The device 16 is provided with means for radio link with the drone, for example of the Wi-Fi (IEEE 802.11) local network type, for the bidirectional exchange of data from the drone 10 to the device 16, in particular for the transmission of the image captured by the camera 14, and from the device 16 to the drone 10 for the sending of piloting commands. The remote-control device 16 is also provided with inclination sensors permitting to control the drone attitude by imparting to the device corresponding inclinations about the roll and pitch axes, it being understood that the two longitudinal and transverse components of the horizontal speed of the drone 10 will be closely linked to the inclination about the two respective pitch and roll axes. The piloting of the drone consists in making it evolve by:

a) rotation about a pitch axis 22, to make it move forward or rearward;

b) rotation about a roll axis 24, to shift it to the right or to the left;

c) rotation about a yaw axis 26, to make the main axis of the drone pivot to the right or to the left; and d) translation downward or upward by changing the gas control, so as to reduce or increase, respectively, the altitude of the drone.

When these piloting commands are applied by the user from the remote-control device 16, the commands a) and b) of pivoting about the pitch 22 and roll 24 axes are obtained by inclinations of the device 16 about its longitudinal axis 28 and its transverse axis 30, respectively: for example, to make the drone move forward, it is just needed to incline the remote-control device 16 forward by tilting it about the axis 28, to move it aside to the right, it is just needed to incline the remote-control device 16 by tilting it to the right about the axis 30, etc. The commands c) and d) themselves result from actions applied by contact of the user's finger 20 on corresponding specific areas of the touch screen 18.

The drone has also an automatic and autonomous system of hovering flight stabilization, activated in particular as soon as the user removes his finger from the touch screen of the device, or automatically at the end of the take-off phase, or in case of interruption of the radio link between the device and the drone.

Figure 2A:
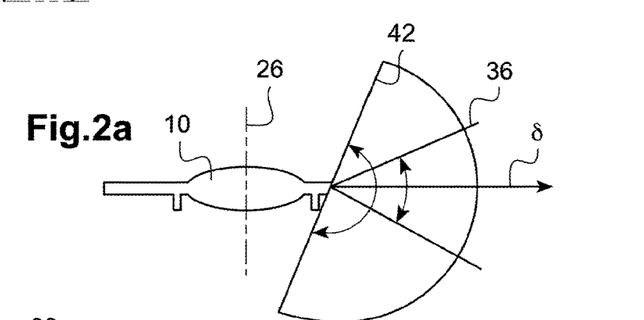
FIGS. 2a and 2b illustrate the modifications of the viewing directions of the camera caused by a forward tilting of the drone, for example during a phase of acceleration.

FIG. 2a schematically illustrates, in profile, the attitude of the drone when the latter is stationary, in a lift condition.

The field covered by a front camera 14 of the conventional type, for example a camera covering a field of 54° and whose sight axis $\delta$ is centred to the horizon, is schematized in 36.

Figure 2B:
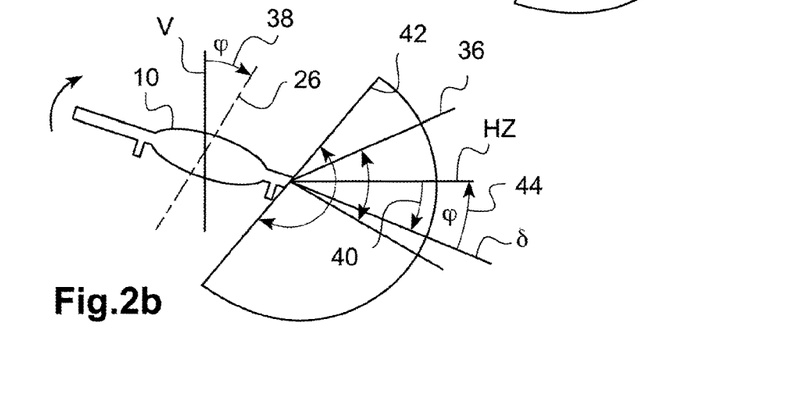

If, as illustrated in FIG. 2b, the drone moves forward with a non-zero horizontal speed, by design, the axis 26 of the drone will be inclined forward by an angle $\varphi$ (pitch angle) with respect to the vertical V. This forward inclination, schematized by the arrow 38, involves an inclination of same value, schematized by the arrow 40, of the axis $\delta$ of the camera with respect to the plane of the horizon HZ. It is hence understood that, over the evolutions of the drone, as the latter speeds up or slows down, etc., the axis $\delta$ oscillates permanently about the direction of the horizon HZ, which will translate in the image into permanent upward and downward oscillation movements.

Comparably, if the drone moves aside to the right or to the left, this movement will be accompanied by a pivoting about the roll axis 24, which will translate in the image into rotations in one direction or the other of the scene captured by the camera.

To compensate for these drawbacks, it has been proposed, as explained in the above-mentioned EP 2 933 775 A1, to provide the camera with a hemispherical-field lens of the fisheye type covering a field of about 180°, as schematized in 42 in FIG. 2a. The image captured by the camera provided with this fisheye lens will of course be subjected to the same oscillation and rotation movements as a conventional camera but only a part of the field captured by this camera will be used by selecting a particular window corresponding to the angular sector 36 captured by a conventional camera, and that will be dynamically displaced in the hemispherical image in the direction opposite to the movements of the drone as determined by the inertial central, so as to annihilate the oscillations that would otherwise be observed in the image.

Hence, in the case illustrated in FIG. 2b, where the drone dives downward by a pitch angle φ (arrow 38) with respect to the vertical V, the capture window will be displaced upward (arrow 44) by an angle of same value, hence returning back towards the horizon HZ the central axis of the sector 36 of a "virtual camera" covering the field corresponding to the image area.

Figure 3:
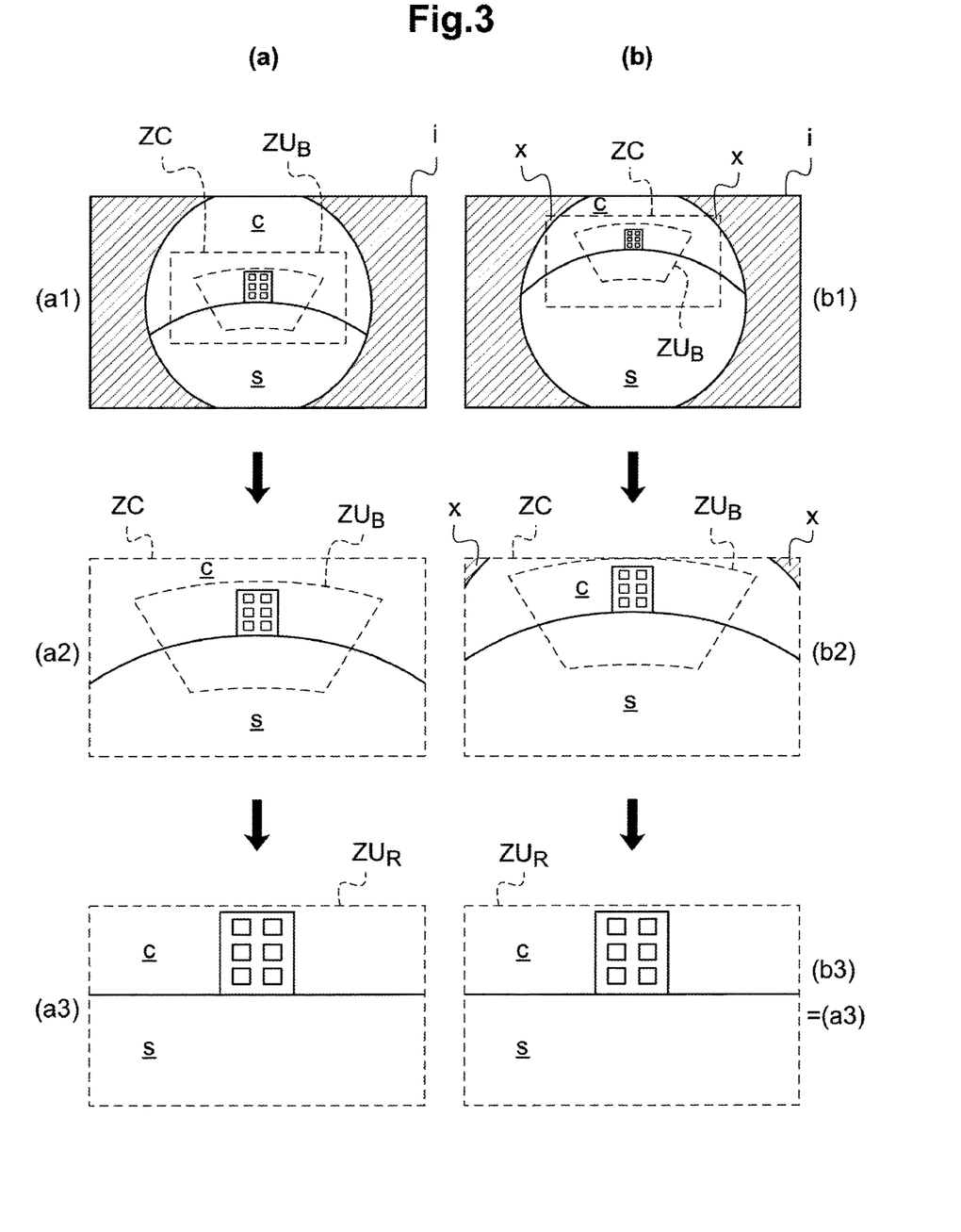
FIG. 3 illustrates in (a1)-(a3) the successive steps of windowing and correction of the distortions applied to the image formed on the sensor of the drone camera so as to produce a straightened image, and in (b1)-(b3) the corresponding steps when the drone attitude is modified, with the camera inclined towards the ground.

FIG. 3 shows in (a1) an example of scene, as collected by the sensor of the video camera provided with the fisheye lens.

As can be observed, the image I of this scene includes very strong geometric distortions, inherent to the hemispheric or quasi-hemispheric coverage of the fisheye lens, straightened on the planar surface of the sensor. Only a part of this image I produced by the fisheye lens will be used. This part is determined as a function i) of the direction in which the "virtual camera" points, ii) of the field of view of the latter (schematized in 36 in FIGS. 2a and 2b), and iii) of its width/height ratio. It is hence defined a "capture area" ZC containing raw pixel data including the raw "useful area" $ZU_B$ that will correspond to the field of the "virtual camera" after compensation for the geometric distortions introduced by the fisheye lens.

It will be noted that it is not useful to capture all the pixels of the image I formed on the sensor, but only a fraction of these latter, corresponding to the capture area ZC, for example a window ZC of about 2 Mpixels extracted from an image I of HD quality (1920×1080 pixels), produced by a sensor whose resolution will typically be of 14 Mpixels (4608×3288 pixels). Hence, only the really required pixel data of the capture area ZC are transferred, data that may then be refreshed at a cadence of 30 frames/second with no particular difficulty. A high-resolution sensor can hence be chosen, while keeping a high image flowrate.

Views (a2) and (a3) of FIG. 3 illustrate the processing operations performed on the pixel data of the capture area ZC to obtain the final image compensated for the geometric distortions: based on the pixel data transferred from the capture area ZC (view (a2)), an algorithm extracts the pixel data of the raw useful area $ZU_B$ and applies thereto a triangular meshing (technique known in itself) then straightens the image by stretching each triangle, to give a straightened useful image $ZU_R$ (view (a3)) with rectified pixel data. The strongly curved horizontal lines of the fisheye image will then be corrected to make them rectilinear and to produce an image corresponding to a natural vision, devoid of geometric distortions.

Views (b1)-(b3) of FIG. 3 are similar to views (a1)-(a3), in a configuration where the attitude of the drone is modified due to the inclination forward of the latter (rotation about its pitch axis), an inclination that follows for example a switching from a still configuration, in hovering flight, to a configuration of moving forward (the linear speed of the drone being all the more great that its inclination is strong).

As illustrated in (b1), to compensate for this downward inclination of the drone, the capture area ZC is moved towards the top of the image, hence in the direction opposite to the inclination of the drone. If the relative position of the raw useful area $ZU_B$ remains substantially the same inside the capture area ZC (to allow the following of the scene aimed at), the capture area will on the other hand now include a far more significant part of ground S than of sky C: if then comparing views (a2) and (b2), it is observed that, in the initial configuration (view (a2)), the sky/ground proportion is about 50/50%, whereas in the modified configuration (view (b2)), the sky/ground proportion is about 25/75%. Moreover, is it is strongly displaced upward, the capture area may include areas X that are located outside the region of the circular image formed by the fisheye objective on the sensor.

On the other hand, the final image $ZU_R$ of the straightened useful area (view (b3)) will be substantially identical to what is was (view (a3)) before the tilting of the drone forwards.

Figure 4:
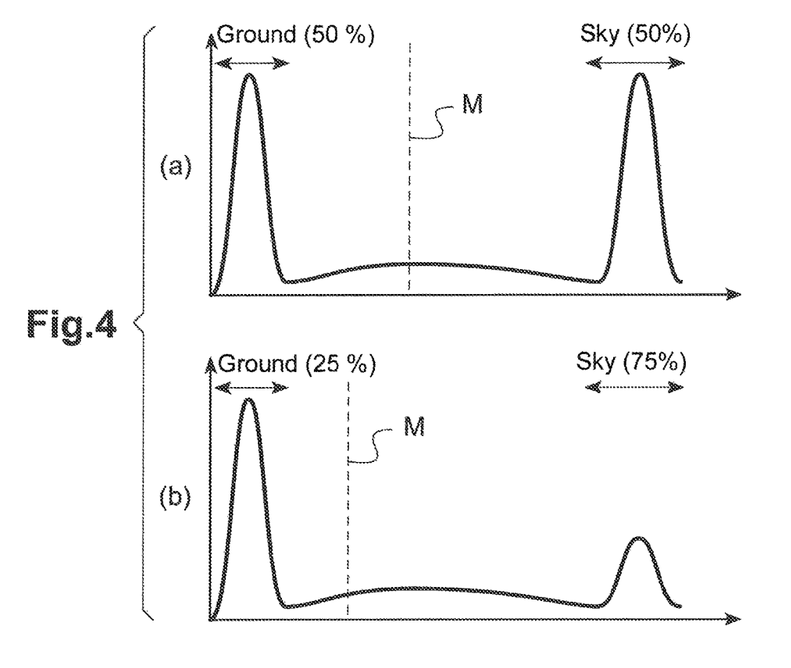
FIG. 4 illustrates in (a) and (b) the brightness histograms obtained by analysis of the capture areas (a2) and (b2), respectively, of FIG. 3.

FIG. 4 illustrates the histograms obtained by analysis of the brightness of the pixels of the thumbnail coming from the capture area ZC, in (a) in the case of view (a2) and in (b) in the case of view (b2), respectively.

As can be seen in this figure, the tilting of the drone forward is translated into a significant modification of the brightness histogram, with an offset towards the left of the mean value M, due to the increase of the ground/sky ratio in the image of the area ZC.

The auto-exposure algorithm will interpret this change of the mean value M as a darkening of the image, which will be automatically compensated by an increase of the time of exposure and/or of the camera sensitivity.

That way, the final images (a3) and (b3) respectively obtained (image of the straightened useful area $ZU_R$), although they display to the user the same framing of the scene, will differ from each other by their exposure setting, the image of view (b3) being clearer than that of view (a3), due to the greater proportion of ground in the capture area of view (b2).

Figure 5:
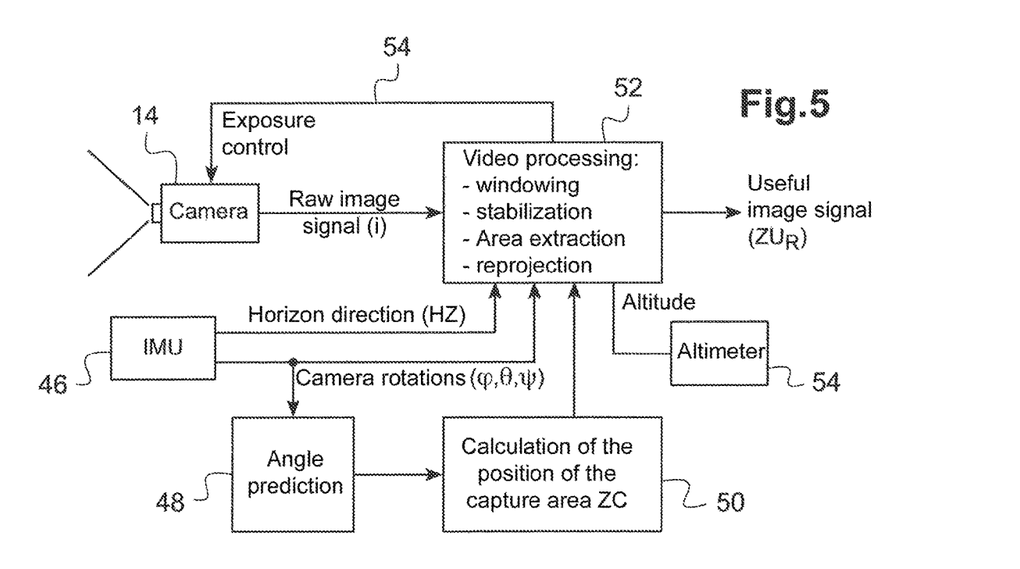
FIG. 5 illustrates as a block diagram the different modules participating to the implementation of the invention.

FIG. 5 illustrates as a block diagram the different modules participating to the implementation of the invention.

The front camera 14 of the drone delivers a raw image signal corresponding to the image I. This camera, mechanically linked to the drone body, is subjected to angular displacements that are measured by an inertial unit (IMU) 12 linked to the drone body and hence to the camera. The rotations of the camera are given by the pitch angle φ, the roll angle θ and the yaw angle ψ, describing the inclination of the drone in the three dimensions with respect to a fixed terrestrial reference system (Euler angles). These data are applied to an angle prediction module 48 piloting a module of calculation of the position of the capture area ZC in the image I. A video processing module 52 receives as an input the raw image signal I and performs various operations of windowing as a function of the position of the captured area ZC calculated by the module 50, of image stabilization, of extraction and straightening of the useful area, to deliver as an output to the user a useful image signal $ZU_R$ to be transmitted to the user, and possibly displayed and recorded.

The module 52 also performs the control (schematized by the return 54) of the camera operation parameters, in particular the auto-exposure (EA) control.

On the other hand, for the implementation of the present invention, the inertial unit 46 is also adapted to deliver to the module 52 an estimate of the horizon direction (HZ in FIG. 2*b*), or "theoretical horizon", corresponding to the orientation, with respect to the drone body, of the plane of the terrestrial reference system with respect to which the pitch φ and roll θ angles characterizing the instantaneous attitude of the drone are measured. Finally, the drone is provided with altitude determination means 54, for example means such as described in the EP 2 644 240 A1 (Parrot), operating as a function of the data produced by an ultrasound telemeter sensor and a barometric sensor, applied to a Kalman filter allowing to deliver an estimated value of instantaneous absolute altitude of the drone in a terrestrial reference system.

Figure 6:
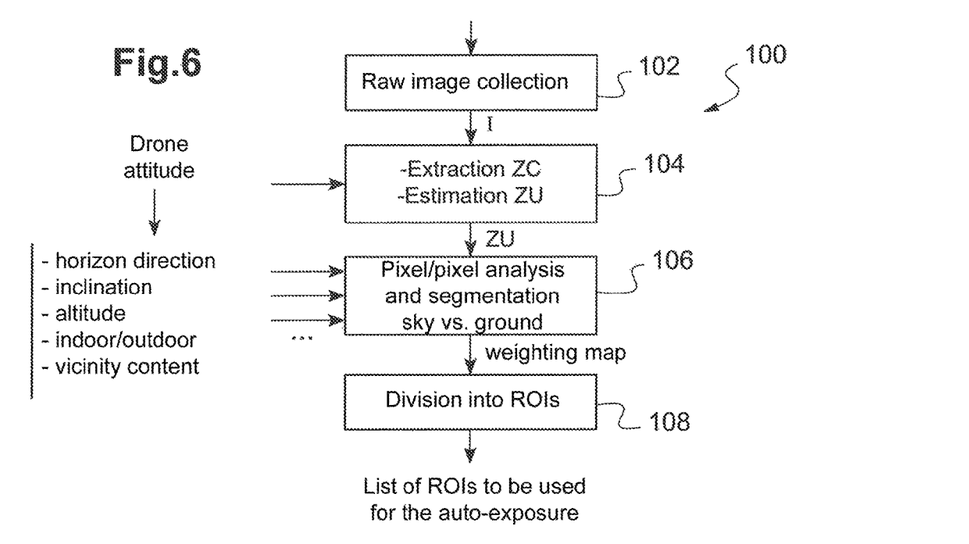
FIG. 6 is a flow diagram explaining the main successive steps of implementation of the invention.

FIG. 6 is a flow diagram explaining the main successive steps of implementation of the invention.

This flow diagram 100 comprises an initial step (block 102) of collection of the raw image I by the camera, followed by a step (block 104) of extraction from this raw image of the capture area ZC as a function of the drone attitude data delivered by the inertial unit IMU, and of estimation of the outline of the useful area ZU corresponding to the image of the scene that will be delivered to the user.

The following step (block 106), characteristic of the invention, consists in an analysis pixel by pixel (or macropixel by macropixel) of the image data of the useful area ZU, in the manner that will be exposed in details hereinafter with reference to FIG. 7. The result of this analysis is the attribution to each pixel (or macropixel) of a weighting coefficient reflecting a more or less high probability of the pixel (or macropixel) to belong to a sky region of the image, as a function of several parameters such as horizon direction, drone altitude, content of the neighbouring pixels (or macropixels), drone instantaneous inclination, etc., and the determination of a boundary of segmentation between sky and ground.

The following step (block 108) consists in defining (according to technics known in themselves, that won't be described in more detail hereinafter) a plurality of regions of interest, ROIs, that are geometric selections of areas of reduced size in the thumbnail coming from the image to be analysed. A brightness histogram is established for each of these ROIs from the thumbnail statistics.

Characteristically of the invention, the ROIs used by the auto-exposure algorithm are selected or weighted as a function of their position with respect to the boundary between sky and ground determined at the previous step 106. The final result is a limited list of ROIs that will be used by the auto-exposure algorithm for adjusting the level of exposure of the sensor by analysis and comparison of the histograms of these different ROIs, according to technics known in themselves.

Generally, the ROIs selected will be those corresponding to the ground area located below the boundary of segmentation, in so far as this area is that which contains the more details and this it is that for which it is desired to optimize the exposure (as a variant, it could however be possible to choose to expose for the sky rather than for the ground, or to combine in variable proportions the parameters of analysis of the ROIs in ground area and sky area).

Figure 7:
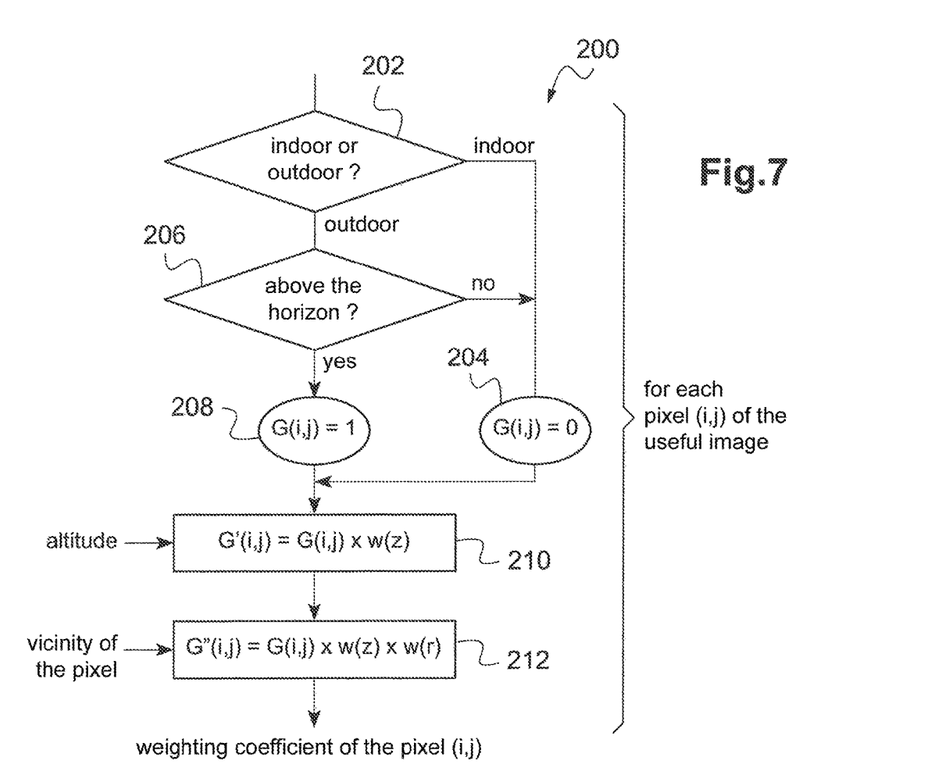
FIG. 7 illustrates more precisely the different steps of analysis allowing ending up in a weighting of each pixel of the image.

FIG. 7 illustrates more precisely the way the pixel-by-pixel analysis of block 106 is operated, to assign to each pixel located within the limits of the useful area ZU a peculiar weighting coefficient that is function of its probability of belonging to a sky area of the image captured.

The flow diagram 200 includes a first step (test 202) consisting in determining if the drone is located indoor or outdoor (because this is only in this latter case that a probability of belonging to the sky will have to be found).

This determination may in particular be made by an analysis of the scene illuminant, which is a parameter available at the output of the automatic white balance (AWB) algorithm implemented by the camera: hence, an illuminant D50 or D65 typically corresponds to a natural light in broad daylight, which indicates that the drone evolves in all likelihood outdoor.

If it is determined in test 202 that the drone evolves indoor, then a zero weight $G(i,j)=0$ is assigned to the pixel (i,j), because in this case it is considered that its probability of belonging to a sky area is zero (block 204). In the contrary case, it is then determined, as a function of its position in the image, if the pixel is located above or below the theoretical horizon as determined by the inertial unit IMU (test 206).

If this pixel is located below the horizon, a zero weight $G(i,j)=0$ is assigned thereto (block 204). In the contrary case, the weight $G(i,j)$ is set to 1 (block 208) to indicate a probability—at this stage—of belonging to the sky of 100%.

This probability must however be weighted, because, even if the pixel corresponds to an outdoor area located above the horizon, it may be located in a region likenable to a ground area, for example if it belongs to the image of a building, a tree, etc., located above the horizon: they are areas including details, which it is advisable to expose correctly, and which in any case do not belong to the sky although located above the horizon.

For that purpose, a first weighting is applied (block 210) as a function of the altitude. This weighting is based on an observation that the more the drone flies high, the more chance there is that the horizon is cleared, i.e. that the part of the image located above the horizon is not full of images of buildings, trees, hills, etc. The weight $G(i,j)=1$ is then weighted by a function $w(z)$ varying monotonously (linearly, by steps or any other suitable progression) as a function of the altitude z, with a value comprised between $w(0)=0$ and $w(z_{max})=1$, $z_{max}$ being a maximum value of altitude, for example $z_{max}=300$ meters. The result is a weighting coefficient value $G'(i,j)=G(i,j) \times w(z)$.

A second weighting $w(n)$ may be applied (block 212) to the value $G'(i,j)$ obtained at block 210, in particular as a function of the analysis of the vicinity of the pixel (i,j), i.e. an analysis (according to technics known in themselves) of variance, gradient, etc. with respect to the pixels of the image surrounding the pixel (i,j) object of the weighting.

Still other weighting operations may be applied, for example as a function of the drone attitude, in particular of its pitch angle φ given by the inertial unit IMU: if this data element indicates that the drone is, at the instant of the analysis, strongly inclined forward, the probability of a pixel to belong to a sky are is lower than if the drone is in hovering flight (horizontal attitude), or a fortiori in a nose-up attitude during a phase of strong deceleration or rearward motion.

The analysis of the flow diagram 200 is performed for each pixel (or macropixel) of the image of the useful area, which allows to obtain at the end of the analysis a map of weighting of each pixel of this image, reflecting the probability of belonging to the sky of the considered pixel.

It will then be possible to implement the auto-exposure taking this weighting into account, for example (but in a non-limitative way) by controlling the auto-exposure as a function of the image data exclusively or predominantly of the sky area.

As indicated hereinabove, the auto-exposure algorithm uses a plurality of regions of interest ROIs distributed over the image.

Figure 8:
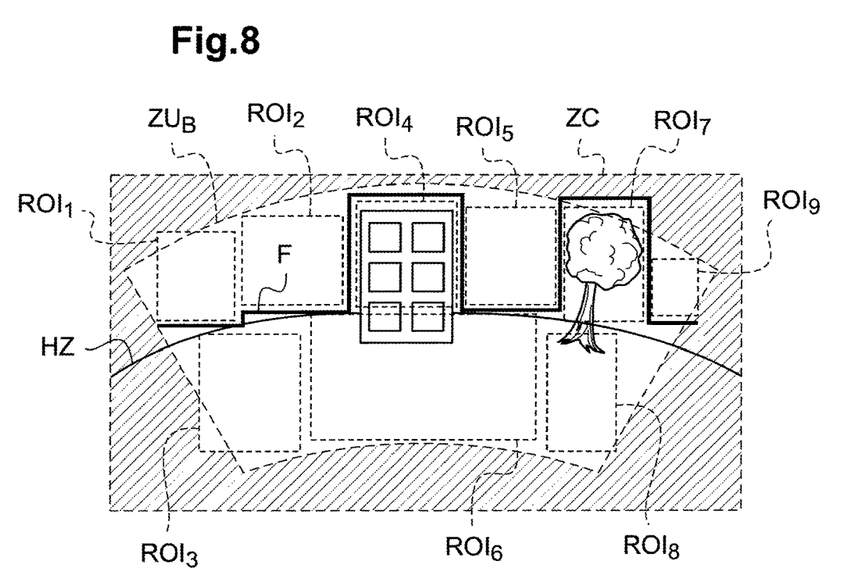
FIG. 8 illustrates the analysis of the image according to a first variant, implementing regions of interest defined automatically inside this capture area.

In a first variant of implementation, illustrated in FIG. 8, the auto-exposure operates based on ROIs whose size and/or position are dynamically defined i) inside the thumbnail coming from the useful area $ZU_B$ and ii) characteristically of the invention, below the boundary of segmentation F that separates the sky area (above the boundary F) and the ground area (below the boundary line F).

The ROIs are distributed so as to be located totally or partially inside the useful area $ZU_B$, i.e. if the ROI definition algorithm generates ROIs outside the useful area $ZU_B$, these latter will be excluded from the subsequent analysis for the auto-exposure control. Moreover, with respect to the boundary F, if the ROI generation algorithm defines for example the nine regions $ROI_1 \ldots ROI_9$ illustrated in FIG. 8, then the auto-exposure control will operate only on the basis of the ROIs located in the ground are, below the boundary F, i.e. the ROIs denoted by $ROI_3$, $ROI_4$, $ROI_6$, $ROI_7$ and $ROI_8$ in this example. The exposure will then be made on the parts of the image comprising the most details, which are generally those which are of interest for the user and for which it is advisable to optimize the exposure.

Figure 9:
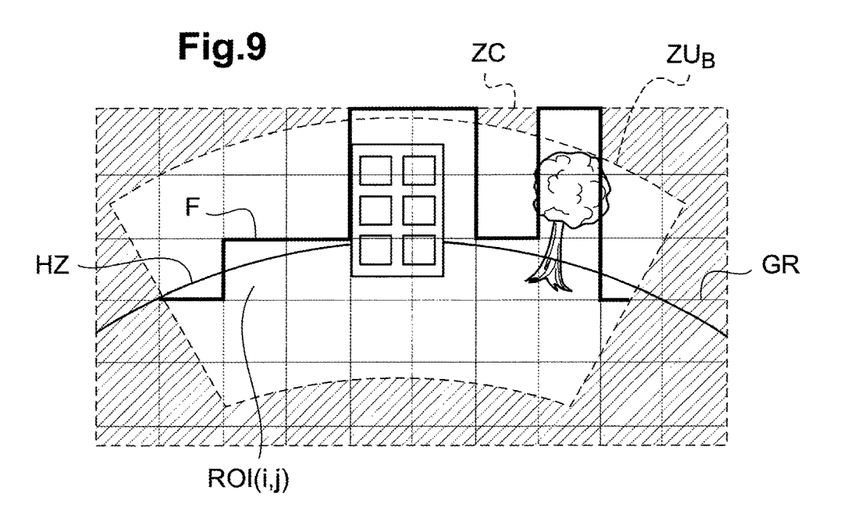
FIG. 9 illustrates the analysis of the image according to a second variant, implementing the making of a grid in this capture area.

FIG. 9 illustrates a second variant of implementation, in which the ROIs are no longer defined dynamically and with a variable size, but as a regular grid in the thumbnail coming from the capture area ZC, with a grid GR each elementary square or rectangle ROI(i,j) of which will be used or not for the auto-exposure control according to whether it is above or below the boundary F of segmentation between sky area and ground area.

The invention claimed is:

1. A drone (10) comprising:
    a camera (14) linked to the drone body, comprising:
        a hemispheric-field lens of the fisheye type, pointing in a fixed direction with respect to the drone body;
        a digital sensor collecting the image (I) formed by the lens; and
        a dynamic exposure control mechanism that automatically controls the sensor exposure;
    an inertial measurement device (16), adapted to measure the Euler angles ($\varphi$, $\theta$, $\Psi$) characterizing the instantaneous attitude of the drone with respect to an absolute terrestrial reference system and delivering as an output current drone attitude data;
    a processor; and
    a non-transitory computer readable memory storing an extractor module, a control module, a reprojection module and an analysis module, which when executed by the processor:
        the extractor module (52), is adapted to define, in said image (I) formed by the lens over the extent of the sensor, the position of a capture area (ZC) of reduced size;
        the control module (48, 50, 52), receiving as an input the current drone attitude data and is adapted to dynamically modify the position and the orientation of the capture area (ZC) in said image (I) in a direction opposite to that of the changes of values of the angles measured by the inertial measurement device;
        the reprojection module (52), receiving as an input image data, formed of pixels or macropixels, of a useful area (ZUB) extracted from the capture area (ZC), delivers as an output corresponding straightened image data (ZUR), compensated for the geometric distortions introduced by the fisheye lens; and
        the analysis module is adapted to define a plurality of regions of interest ROIs (ROI1 ... ROI9; ROI(i,j)) distributed over the useful area, and to control the dynamic exposure control mechanism as a function of the respective image data contained in a thumbnail coming from the useful area, in each ROI,
characterized in that the analysis module is moreover adapted to:
    analyse said current image data of the useful area so as to assign to each of these data elements a weighting coefficient representative of a probability of belonging to the sky;
    dynamically define at each image a boundary of segmentation (F) of the useful area between a sky area and a ground area, as a function of the weighting coefficients assigned to each image data element;
    define two distinct groups of ROIs, for the sky area and for the ground area, respectively; and
    control the dynamic exposure control mechanism as a function of the respective image data elements contained in the thumbnail coming from the useful area, in ROIs of one of said selected groups.

2. The drone of claim 1, wherein:
said weighting coefficient representative of a probability of belonging to the sky is a coefficient function of the position of the current image data element analysed by the analysis module with respect to a theoretical horizon direction (HZ) delivered by the inertial measurement device.

3. The drone of claim 1, wherein:
said weighting coefficient representative of a probability of belonging to the sky is a coefficient function of the image data of the vicinity (n) of the current image data element analysed by the analysis module.

4. The drone of claim 1, wherein:
the non-transitory computer-readable memory of the drone comprises altitude determination module (54), which when executed by the processor the altitude determination module is adapted to deliver an estimated value of the altitude (z) of the drone with respect to the ground, and
said weighting coefficient representative of a probability of belonging to the sky is a coefficient function of said altitude.

5. The drone of claim 1, wherein:
the camera comprises a non-transitory computer-readable medium storing an illuminant module, which when executed analyzes the illuminant of the scene captured by the camera, and
said weighting coefficient representative of a probability of belonging to the sky is a coefficient function of said illuminant.

6. The drone of claim 1, wherein:
said weighting coefficient representative of a probability of belonging to the sky is a coefficient function of the pitch inclination of the drone with respect to the horizontal.

7. The drone of claim 1, wherein the ROIs may be ROIs (ROI1 ... ROI9) whose size and/or position are defined dynamically at each image in the useful area.

8. The drone of claim 1, wherein the ROIs are ROIs (ROI(i,j)) defined by a grid (GR) of ROIs distributed in a uniform and predetermined manner over the useful area.

\* \* \* \* \*